United States Patent
Ha et al.

(10) Patent No.: US 7,035,442 B2
(45) Date of Patent: Apr. 25, 2006

(54) USER AUTHENTICATING SYSTEM AND METHOD USING ONE-TIME FINGERPRINT TEMPLATE

(75) Inventors: Tai-Dong Ha, Seoul (KR); Jae-Hyun Jun, Kyungki (KR); Woo-Seok Chang, Kyungki (KR); Young-Mi Kang, Seoul (KR); Dong-Won Lee, Saratoga, CA (US)

(73) Assignee: Secugen Corporation, Santa Clara, CA (US)

( * ) Notice: Subject to any disclaimer, the term of this patent is extended or adjusted under 35 U.S.C. 154(b) by 636 days.

(21) Appl. No.: 10/130,470

(22) PCT Filed: Jun. 1, 2001

(86) PCT No.: PCT/KR01/00931

§ 371 (c)(1),
(2), (4) Date: Jan. 17, 2003

(87) PCT Pub. No.: WO02/37403

PCT Pub. Date: May 10, 2002

(65) Prior Publication Data
US 2003/0152254 A1    Aug. 14, 2003

(30) Foreign Application Priority Data
Nov. 1, 2000    (KR) ................ 2000-64565

(51) Int. Cl.
*G06K 9/00*    (2006.01)
(52) U.S. Cl. ............ 382/124; 380/279; 713/168; 340/5.81

(58) Field of Classification Search ............. 382/124, 382/115, 190, 209, 217, 218; 713/168, 171, 713/155, 176, 169, 170; 709/203; 380/277, 380/278, 279, 282, 30; 705/67, 71, 57, 64; 340/5.8, 5.81
See application file for complete search history.

(56) References Cited

U.S. PATENT DOCUMENTS

| | | | |
|---|---|---|---|
| 5,987,232 A | 11/1999 | Tabuki | 726/5 |
| 6,011,858 A | 1/2000 | Stock et al. | 382/115 |
| 6,038,315 A | 3/2000 | Strait et al. | 382/115 |
| 6,067,621 A | 5/2000 | Yu et al. | 713/172 |

(Continued)

FOREIGN PATENT DOCUMENTS

EP    1 081 632    3/2001

(Continued)

*Primary Examiner*—Sheela Chawan

(57) ABSTRACT

This invention relates to a user authenticating system and a method using aone-time fingerprint template. The system and the method according to the invention are improvements of the conventional user authentication based on the manner of comparing the fingerprint feature data only, for the purpose of preventing a false authentication by misusing fingerprint feature data, if exposed in the course of transfer thereof. In the system and the method according to the invention, fingerprint feature data of a user are combined with an OTT key transferred from a server. The combined result is encoded and transferred to an authenticating server. The authenticating server then confirms validity of the OTT key and authenticates the user based on the fingerprint. Thus, the present invention has an advantage of preventing a false authentication through hacking, etc., even if the OTT key is exposed to a network, because the OTT key is used only once for authentication.

16 Claims, 11 Drawing Sheets

U.S. PATENT DOCUMENTS

| | | |
|---|---|---|
| 6,122,737 A | 9/2000 | Bjorn et al. ................. 713/186 |
| 6,151,676 A * | 11/2000 | Cuccia et al. ................ 713/176 |
| 6,161,185 A * | 12/2000 | Guthrie et al. .................. 726/5 |
| 6,167,517 A | 12/2000 | Gilchrist et al. ............ 713/186 |
| 6,256,737 B1 | 7/2001 | Bianco et al. .............. 713/186 |
| 6,317,834 B1 | 11/2001 | Gennaro et al. ............ 713/186 |
| 6,320,974 B1 | 11/2001 | Glaze et al. ................ 382/115 |
| 6,324,020 B1 | 11/2001 | Teng et al. ................. 359/726 |
| 6,332,193 B1 | 12/2001 | Glass et al. ................ 713/170 |
| 6,401,066 B1 | 6/2002 | McIntosh .................... 706/273 |
| 6,904,449 B1 * | 6/2005 | Quinones .................... 709/203 |
| 2002/0010862 A1 | 1/2002 | Ebara ........................ 713/186 |
| 2003/0085917 A1 | 5/2003 | Chang et al. ............... 715/738 |
| 2003/0105966 A1 | 6/2003 | Pu et al. ..................... 713/186 |

FOREIGN PATENT DOCUMENTS

| | | |
|---|---|---|
| KR | 213188 | 5/2000 |
| KR | 274389 | 12/2000 |
| KR | 2001-2738 | 1/2001 |
| WO | WO 98/25227 | 6/1998 |
| WO | WO 99/26188 | 5/1999 |
| WO | WO 99/26372 | 5/1999 |
| WO | WO 99/26373 | 5/1999 |
| WO | WO 01/35348 | 5/2001 |
| WO | WO 02/089018 | 11/2002 |

* cited by examiner

PRIOR ART

Fig. 3

| INDEX | GUID |
|---|---|
| 1 | XXXX · · · · | } 1ST OTT KEY
| 2 | ΔΔΔ · · · · | } 2ND OTT KEY
| 3 | 0000 · · · · | } 3RD OTT KEY
| ⋮ | ⋮ |

OTT KEY = { INDEX, GUID }

Fig. 4

| ID | FINGERPRINT FEATURE DATA | INDEX |
|  |  | GUID |

OTT KEY = { INDEX, GUID }

USER AUTHENTICATING SYSTEM AND METHOD USING ONE-TIME FINGERPRINT TEMPLATE

TECHNICAL FIELD

The present invention relates to a user authenticating system and a method using one-time fingerprint template, and more particularly to a user authenticating system and a method, characterized in that a client transmits a combination of characteristic data of his/her own fingerprint with a one-time template (OTT) key, while an authenticator authenticates the user by determining validity of the OTT key and deletes a once-used OTT key.

BACKGROUND ART

With an increase of on-line services provided through internet, authentication of users has become a very significant factor. For purchase of goods through internet shopping sites or financial banking services provided for by banking sites, for instance, input of the user information (ID and password) to the corresponding site is mandatory.

In addition to the services resulting in financial transactions such as banking and shopping services, user authentication has become prevalent in terms of protecting personal information exposed to the servers of sites necessitating simple exchanges of the users' information.

The conventional way of authenticating the users is generally performed in the following manners. A client first inputs his/her own password to a server, which in turn authenticates the client only when the inputted password is identical to the stored and registered password. Another way of authenticating users is to utilize bio-information of the users such as fingerprint.

As a remedy of consolidating security of the user authentication system using passwords, a one-time password (OTP) is available. It is a method of blocking the repeated use of the ever-used password based on the characteristics that the calculation of hash function is easy in forward order but is difficult in reverse order. This method can serve to eliminate the danger of false authentication using a password exposed to the network in the course of being transferred to a server.

FIG. 1 is a schematic diagram illustrating the mechanism of authenticating a user by using the one-time available password. As shown in FIG. 1, the user decides a password in the preparing step, and registers in a server after performing a hash function on the password appropriate times (e.g., 100 times). In other words, when assuming the hash function to be "h( )", the calculation is made as follows.

P100=h[h( ... h(password) ... )]

←100 times→

Here, the P100 represents that the hash function is performed 100 times on the password. The server registers P100 which is a result of performing the hash function, and that P100 was performed the hash function 100 times [step 11].

When actually logging in subsequently, the server requests the P99 (performing the hash function on the password 99 times), and the user calculates the P99 in its own computer. In other words, if the user inputs a password to his/her own PC, the computer calculates the P99 and transfers the calculated P99 to a server [step 21]. The server receives and performs once the hash function of the P99 to obtain P100. The server then determines whether the obtained P100 coincides with the P100 stored in the server (P100=h (P99)) [step 13]

If the authentication is successfully completed, the server renews the P100 and stores the P99 [step 15]. In a next log-in, the server requests P98, and the same procedure is repeated.

According to the user authentication of the OTP manner as shown in FIG. 1, even if the P99 is exposed by a communication tapper, the tapper is unable to know the P98. Therefore, the user can transmit his/her password with no concern.

Meanwhile, the user authentication using the fingerprint is a method of authenticating the users by transmitting the fingerprint data for the purpose of authentication from a user's PC to a network, and comparing the data with those stored in the server. The fingerprint data are normally transferred in the encrypted form.

Under the OTP user authentication method, a server registration procedure must be undergone again for authentication of a user once after the user transferred a P1. Further, the user needs to call the hash function several times, thereby consuming a considerable time for authentication.

The user authentication using fingerprint also poses the following problems. First, an exposure of a password does not affect alternation of the password, but an exposure of fingerprint data constrains alternation of the fingerprint data in many aspects (e.g., the number of fingerprint or the fingerprint of a finger convenient for authentication, etc.). Second, the bio-information including the fingerprint slightly differs in each input, and therefore, the OTP algorithm described above (which can eliminate the danger of false authentication using the password exposed in the network) cannot be used. Third, the fingerprint data are normally transferred in the encrypted form, and hence, an exposure of the encrypted fingerprint data is apt to be led to a false authentication in its entirety.

DISCLOSURE OF INVENTION

To solve the above problems, it is an object of the present invention is to provide a user authenticating system and a method by using a one-time fingerprint template comprising the following steps: A client (a user's PC) sends a one-time template (OTT), which is a combination of fingerprint data with a random OTT key transferred from an authenticating server, to the authenticating server; The authenticating server separates the OTT key from the OTT to confirm whether the separated OTT key coincides with the OTT key stored in the authenticating server, and authenticates the user based on the fingerprint; The authenticating server then deletes the once-used OTT key so that another random OTT key can be used for a next authentication. Therefore, even if the OTT key is exposed in the course of authentication, false authentications through hacking can be prevented because a newly renewed OTT key is used for the next authentication.

BRIEF DESCRIPTION OF DRAWINGS

The The above and other objects, features and advantages of the present invention will become more apparent from the following detailed description when taken, in conjunction with the accompanying drawings, in which:

FIG. 3 is a diagram showing a data structure of an OTT key;

FIG. 4 is a diagram showing a data structure of an OTT;

BEST MODES FOR CARRYING OUT THE INVENTION

Construction of the System

Figure 1:
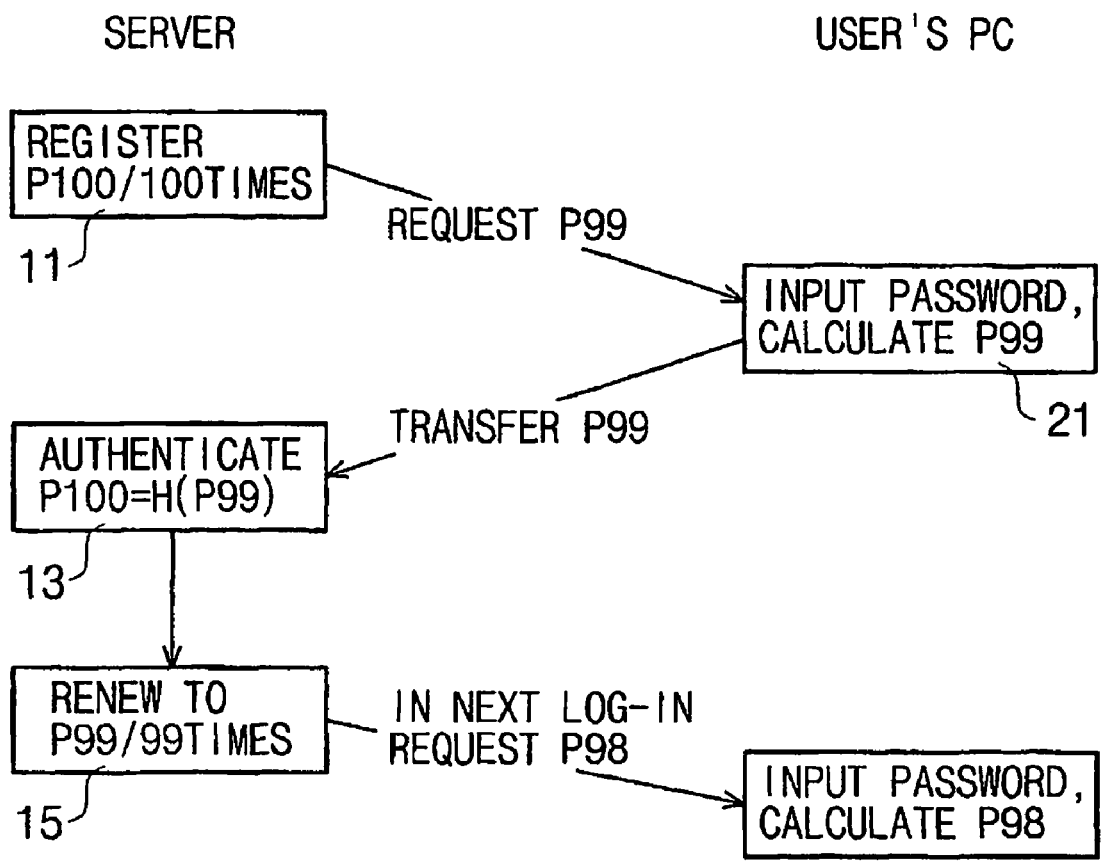
FIG. 1 is a system flowchart illustrating a method for authenticating users based on the conventional one-time password (OTP) manner.
Figure 2A:
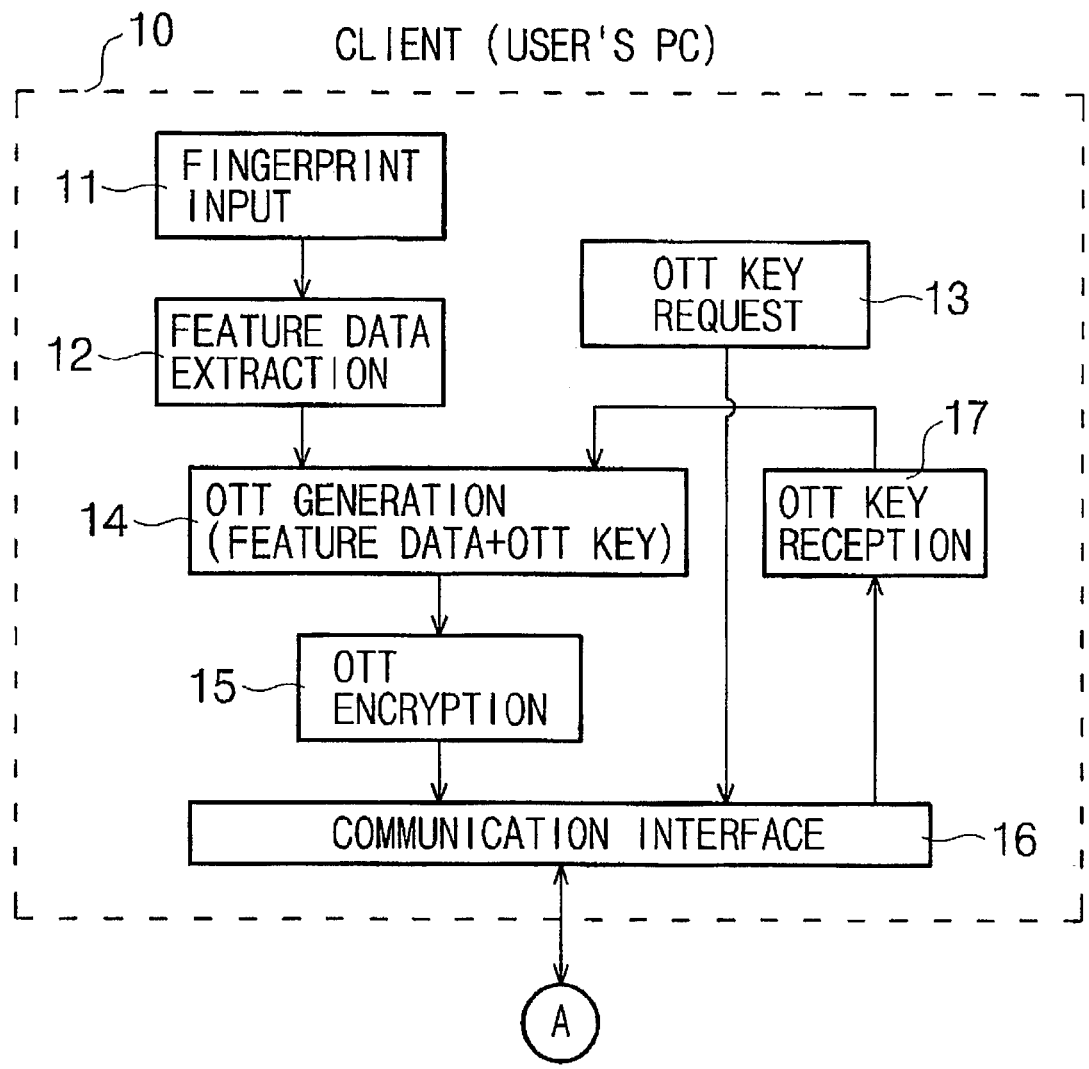
FIGS. 2A and 2B are a block diagram showing a construction of a user authenticating system according to the present invention.
Figure 2B:
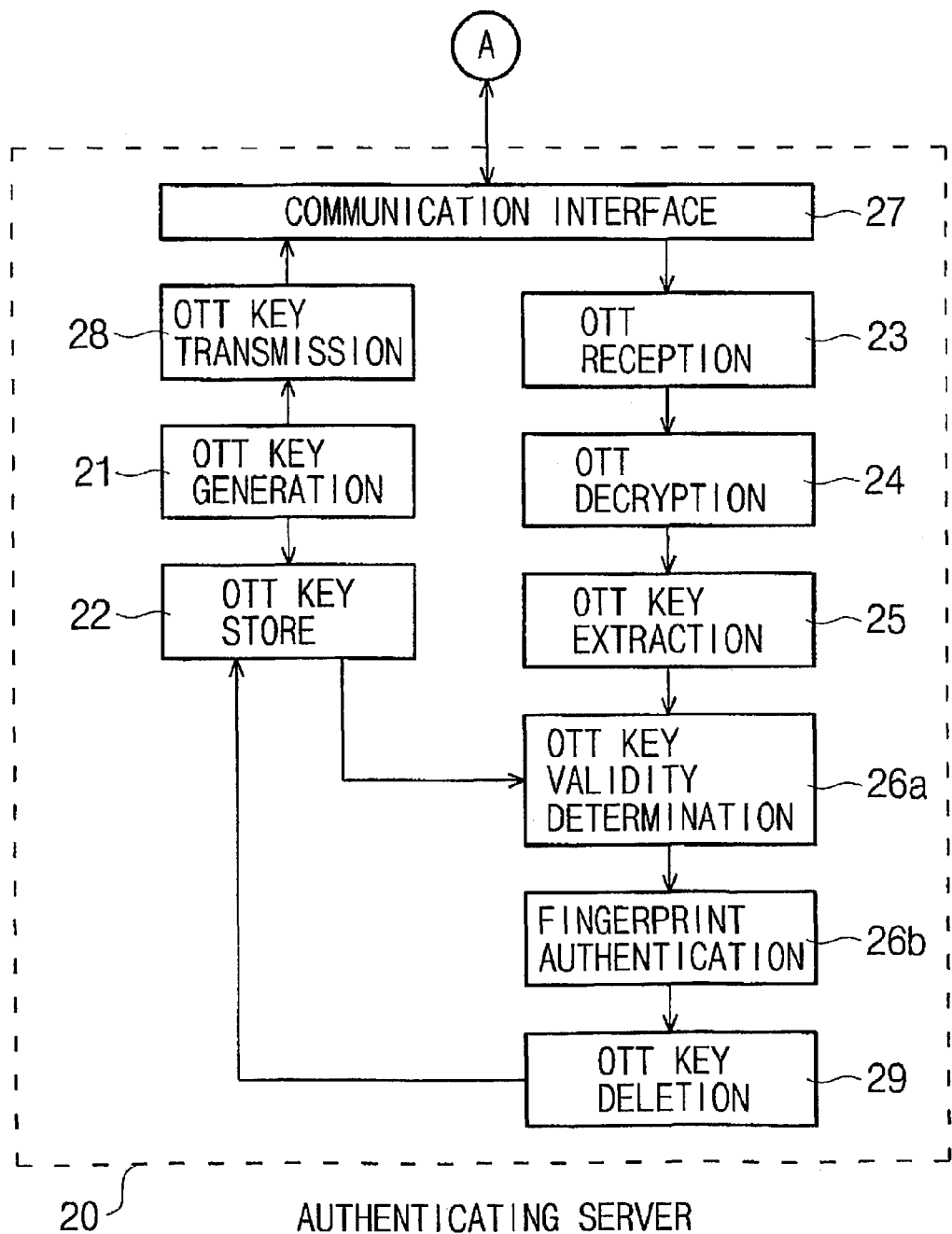

FIGS. 2A and 2B are a block diagram showing a construction of a user authenticating system according to the present invention. The system overall comprises a user PC 10, which is a client desiring to obtain a user authentication for an access to a server, and an authenticating server 20 performing an authentication in accordance with the user's request for authentication that has been transferred. The construction of the system in FIGS. 2A and 2B were drawn from the perspective that a user authentication is performed by using a one-time fingerprint template. Considering the actual user's perspective, however, a web site server needs to be included as well because the user should either search a web or be provided a web service once after obtaining a user authentication and receiving a web page. The web site server may be incorporated into or physically separated from the authenticating server 20. The system separating a web site server from the authenticating server 20 will be explained later with reference to FIGS. 5A through 5D.

The client 10 and authenticating server 20 include communication interfaces 16, 27, respectively.

In addition to the communication interface 16, the client 10 comprises: a fingerprint input section 11 for reading-in the user's fingerprint to obtain authentication from the authenticating server 20; a fingerprint feature data extracting section 12 for extracting fingerprint feature data from the inputted fingerprint; an OTT key requesting section 13 for requesting the authenticating server 20 a transfer of an OTT key to; an OTT key receiving section 17 for receiving the OTT key transferred from the authenticating server; an OTT generation section 14 for generating an OTT by combining the received OTT key with the fingerprint feature data; and an OTT encrypting section 15 for encrypting the OTT in a predetermined manner.

In addition to the communication interface 27, the authenticating server 20 comprises: an OTT generation section 21 for generating the OTT key upon request of the OTT key by the client; an OTT key storing section 22 for storing the generated OTT key; an OTT key transmitting section 28 for transmitting the generated OTT key to the client; an OTT receiving section 23 for receiving the encrypted OTT transferred from the client; an OTT decrypting section 24 for decrypting the encrypted and received OTT so as to be restored into the original OTT; an OTT key extracting section 25 for extracting the OTT key from the restored OTT; an OTT key validity determination section 26a for determining validity of the OTT key by comparing the OTT key stored in the OTT key storing section 22 with the OTT key extracted from the OTT key extracting section 25; a fingerprint authenticating section 26b for authenticating an access by the user's fingerprint by comparing the registered fingerprint feature data with the inputted fingerprint feature data when the OTT key is determined to be valid, and for refusing authentication when the OTT key is determined to be invalid or the compared fingerprint data do not coincide with each other; and an OTT key deleting section 29 for deleting the OTT key used for determining validity of the OTT key after authentication by the fingerprint authentication section so that another OTT key newly generated by the OTT generation section 21 can be used for a next user authentication.

Here, the "OTT" is an abbreviation of "one-time template" used to connote that the fingerprint feature data, which is a technical concept of the present invention, is used one time as a template. The "OTT key," referring to an element constituting the OTT, is an object of comparison for authentication, and defines a variable varying each time for user authentication based on the fingerprint. Further explanation in this regard will be provided later with reference to an operation of the system and the method according to the present invention.

Figure 2C:
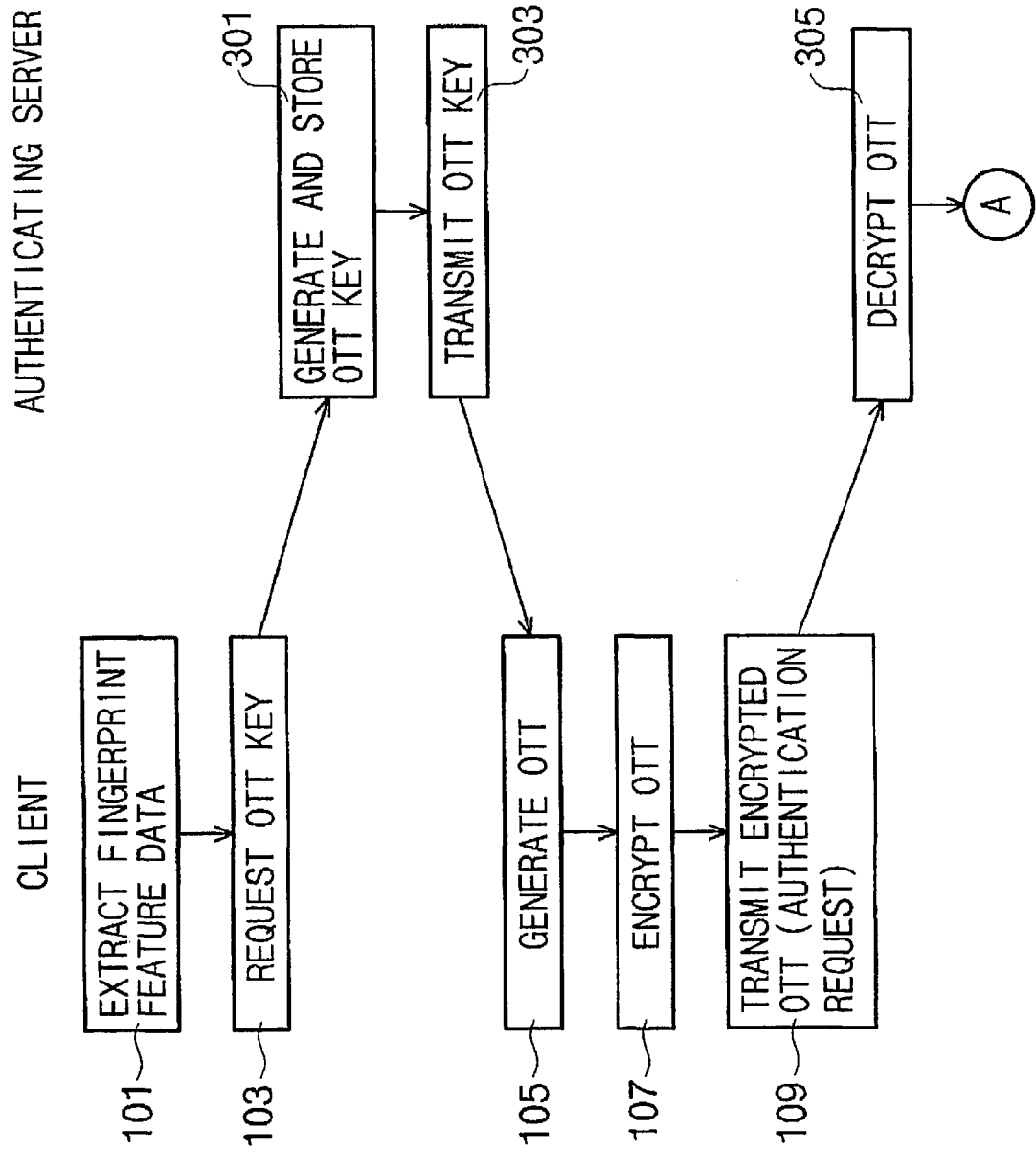
FIGS. 2C and 2D are a block diagram showing a flow of a user authenticating method according to the present invention.
Figure 2D:
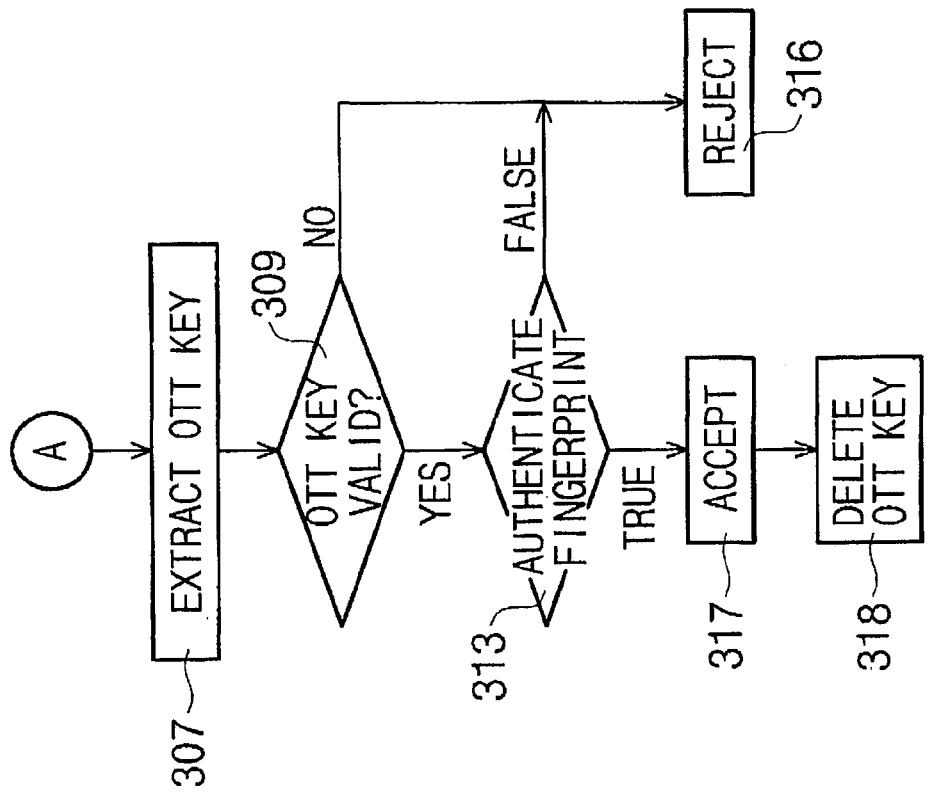

An operation of the system according to the present invention constructed as shown in FIGS. 2A and 2B will now be described with reference to FIGS. 2C and 2D showing a process of the user authenticating method according to the present invention.

Operation of the System According to the Present Invention and Method of Authenticating a User As shown in FIGS. 2C and 2D, the method of authenticating a user comprises the steps of: extracting fingerprint feature data through the fingerprint feature extracting section 12 based on the user's fingerprint data inputted in the client's fingerprint input section 11 [step 101]; requesting the authenticating server a transfer of the OTT key through the OTT key requesting section 13 [step 103]; generating the OTT key through the OTT key generation section 21 of the authenticating server, and storing the generated OTT key in the OTT storing section 22 [step 301]; transmitting the OTT key to the client through the OTT key transmitting section 28 of the authenticating server [step 303]; generating the OTT by combining the OTT key received by the OTT key receiving section 17 of the client with the fingerprint feature data through the OTT generation section 14 [step 105]; encrypting the OTT through the OTT encrypting section 15 of the client [step 107]; requesting an authentication by transmitting the encrypted OTT to the authenticating server [step 109]; restoring the original OTT by receiving the encrypted OTT through the OTT receiving section 23 of the authenticating server, and decrypting the received OTT through the decrypting section 24 [step 305]; extracting the OTT key through the OTT key extracting section 25 of the authenticating server [step 307]; determining validity of the OTT key by comparing the extracted OTT key with the OTT key stored in the OTT key storing section 22 [step 309]; authenticating the fingerprint by determining a validity of the OTT key and a coincidence of the fingerprints if valid [step 313]; and deleting the OTT key used for the authentication so that another OTT key newly generated in the step 301 can be used for a next authentication.

In the authenticating process constructed above, the OTT key generated by the OTT key generating section 21 of the authenticating server has a data structure as shown in FIG. 3. To be specific, one OTT key is composed of indices and a global unique ID (GUID) appended to each index, Indices are defined by serial numbers, while the GUID is a field defined by a random value of a predetermined length. For instance, assuming the length of the GUID to be 16 bytes, the number of kinds is about $3.4 \times 10^{38}$. Therefore, the probability of generating the same ID is almost zero.

The last step of the authenticating process is the step 318 where the OTT key used for the authentication is deleted. Thus, the OTT key generation section 21 should generate new OTT keys for each authentication. Generating an OTT key means creating a new random value with a new index. For instance, a first OTT key having an appended GUID with an index "1" and a random value "R1" is generated in the first authentication. A second OTT key having an appended GUID with an index "2" and a random value "R2" is generated in the second authentication. An n-th OTT key having an appended GUID with an index "n" and a random value "Rn" is generated in the n-th authentication.

However, since an ever-used OTT key is deleted after a fingerprint authentication as described above, the same index used in the first authentication can be re-used among the OTT keys. In other words, an OTT key having an index "1" and a random value "Rn" may be generated.

In the authenticating process described above, the OTT generated by the client's combination of the OTT key with the fingerprint feature data is constructed as shown in FIG. 4. In other words, the OTT has a structure, in which the fingerprint feature data are combined with the OTT key as shown in FIG. 3. The ID at the forefront side field represents the user's log-in ID, while the OTT key field at the most behind field is composed of an index and a GUID as shown in FIG. 3. Instead of authenticating a user based on an ID and fingerprint feature data alone as shown in FIG. 4, the present invention performs a step of authenticating the fingerprint through comparison of the fingerprint feature data with the appended OTT key only when they coincide with each other. Thus, security is enhanced according to the present invention. Furthermore, since the GUID of the OTT key is a random value, and a newly generated random GUID is appended to the OTT key whenever an authentication is requested to the authenticating server, no authentication can be obtained with an exposed OTT key only, even if exposed.

The request for transfer of an OTT key from the client to the authenticating server [step 103] and the transfer of the OTT key from the authenticating server to the client [step 303] can be performed by HTTP in the above authenticating process. Then, there is no need to install any additional application port in the authenticating server.

In the above authenticating process, the encrypting [step 107] and decrypting [step 305] of the OTT may be performed in diverse manners. A public key based on a public key infrastructure (PKI) is used for encrypting the OTT [step 107], while a private key is used for decrypting the OTT [step 305] in the authenticating server. A symmetrical key may also be used for encrypting and decrypting the OTT.

PREFERRED EMBODIMENT OF THE INVENTION

Preferred embodiments of the present invention will be described herein below with reference to the accompanying drawings. In the following description, well-known functions or constructions are not described in detail since they would obscure the invention in unnecessary detail.

The user authenticating system and method described with reference to FIGS. 2A through 2D were explained from the perspective of user authentication only between the user PC 10, which is a client, and the authenticating server 20. In the following description, however, an embodiment of using the authenticating method according to the present invention will be explained such that the user is provided with a web page from a web service server 20 (hereinafter, referred to as a "web server").

Figure 5A:
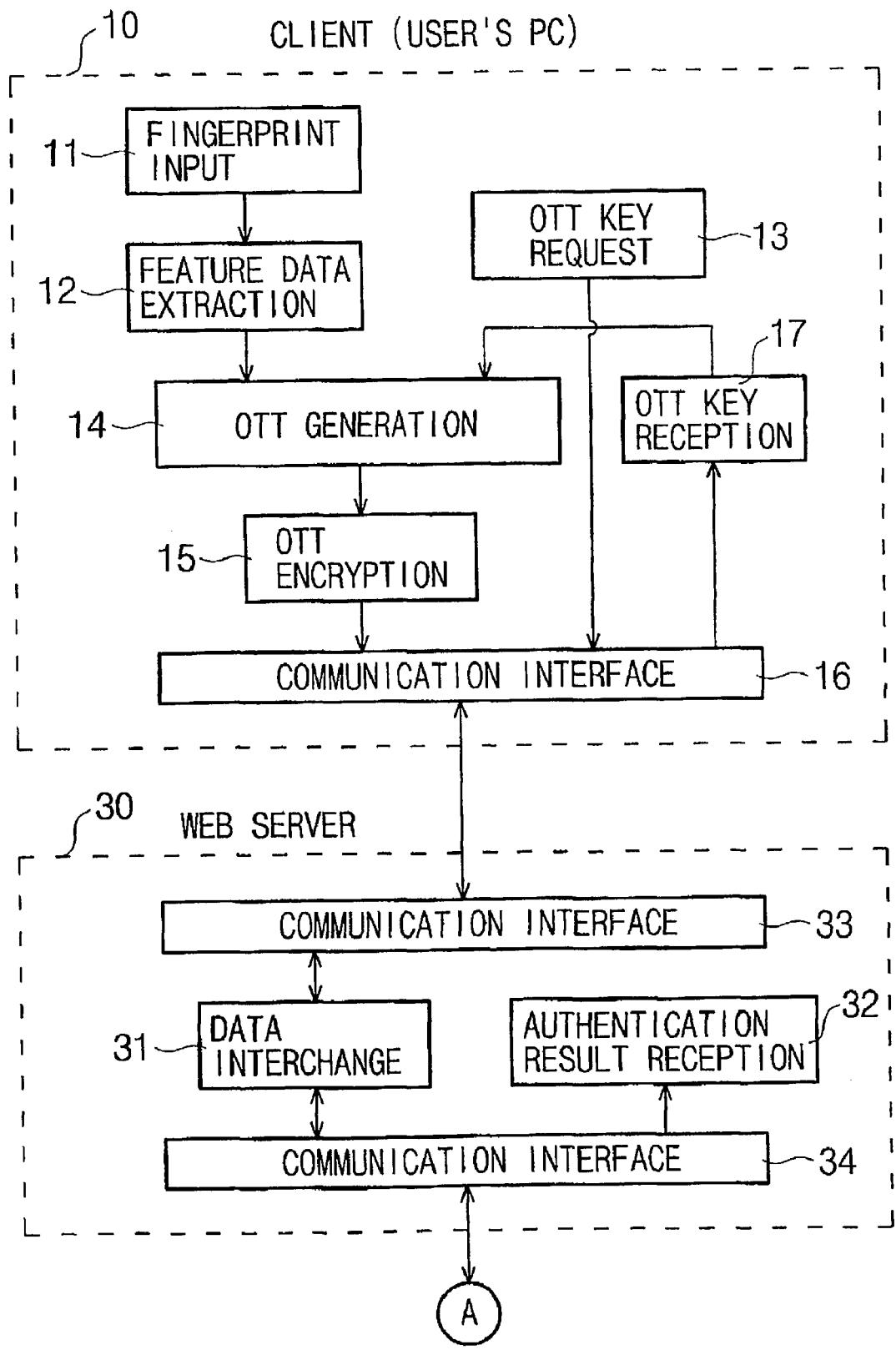
FIGS. 5A and 5B are a block diagram showing a construction of a user authenticating system according to an embodiment of the present invention.
Figure 5B:
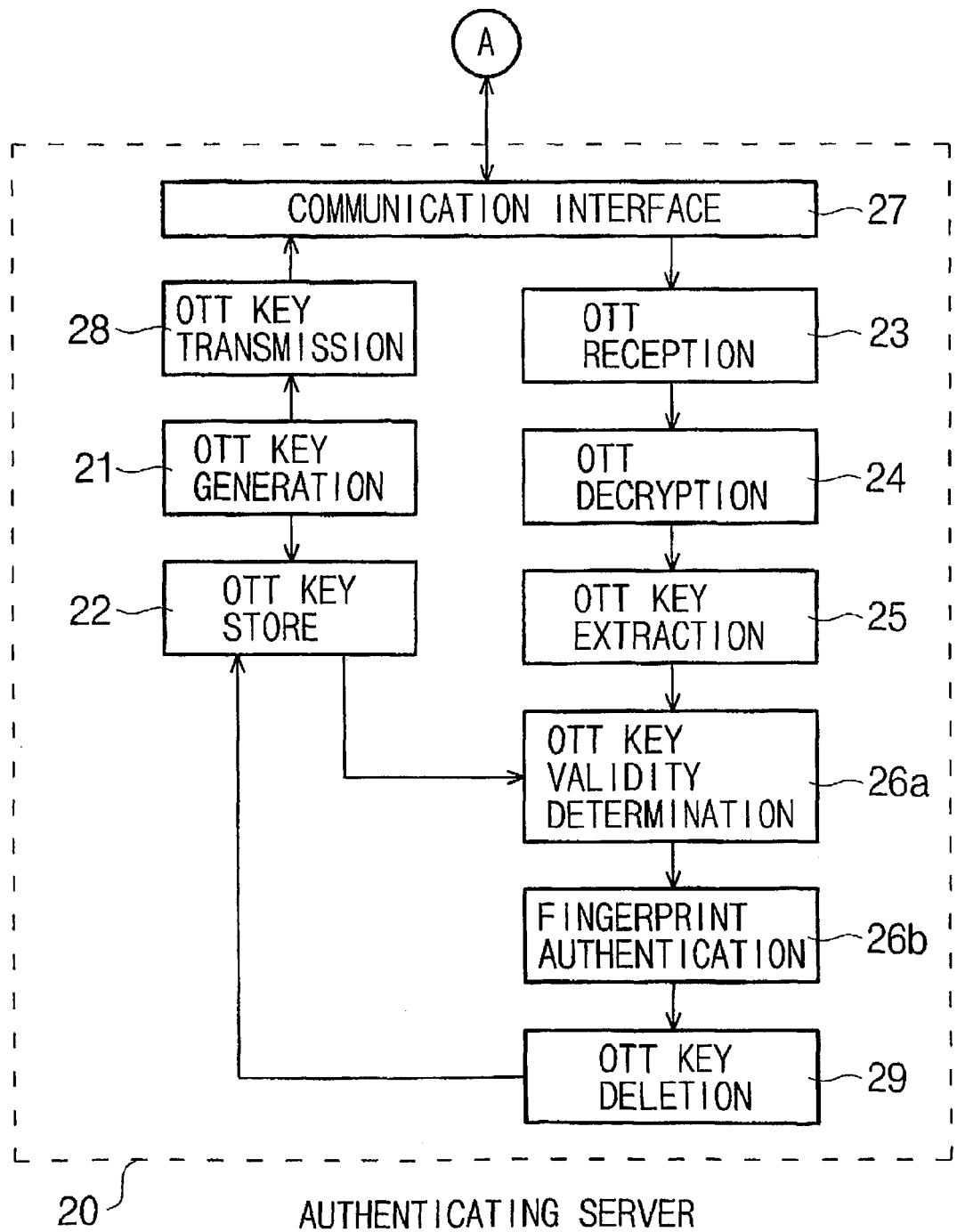
Figure 5C:
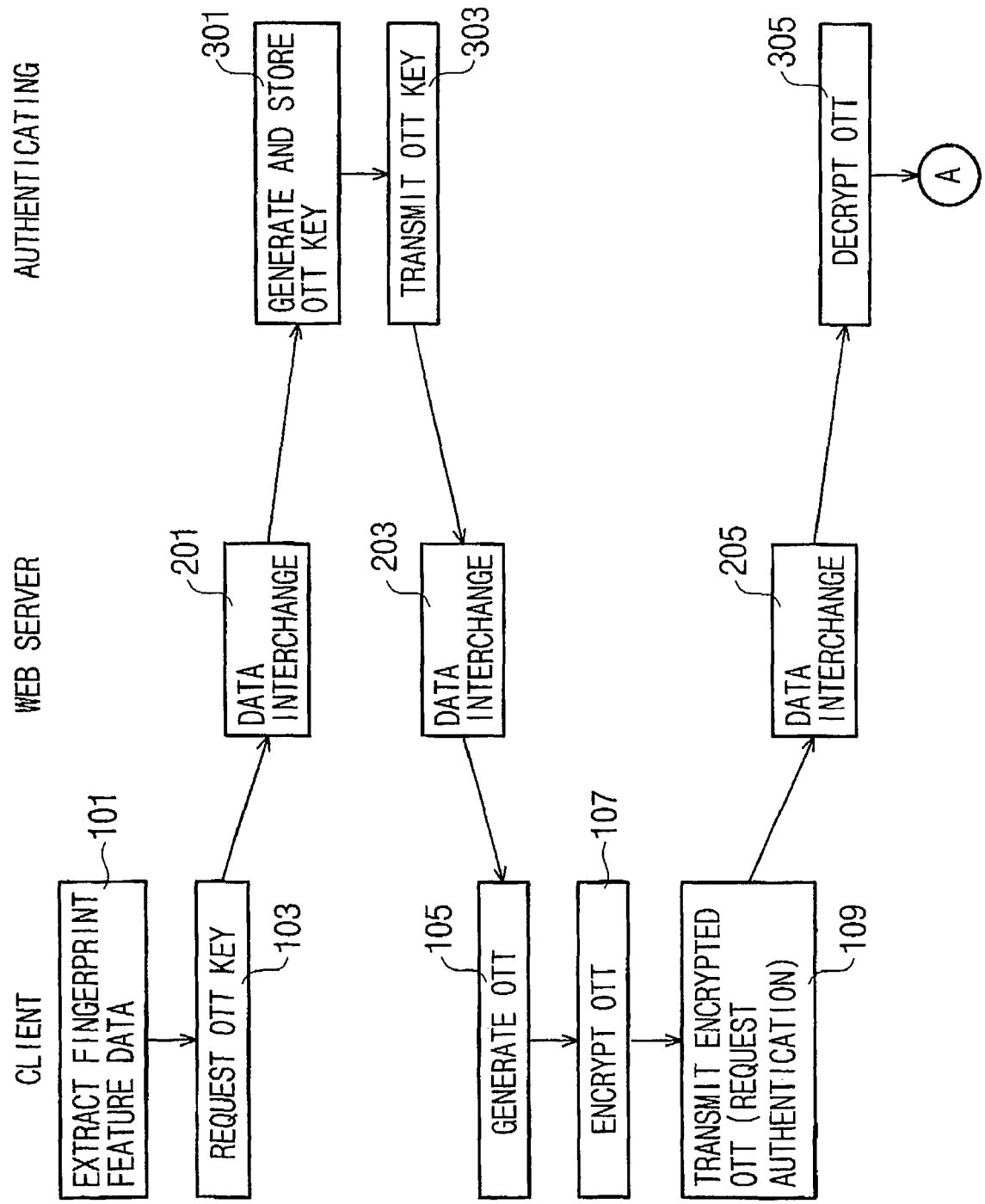
FIGS. 5C and 5D are a block diagram showing a flow of a user authenticating method according to the embodiment of the present invention.
Figure 5D:
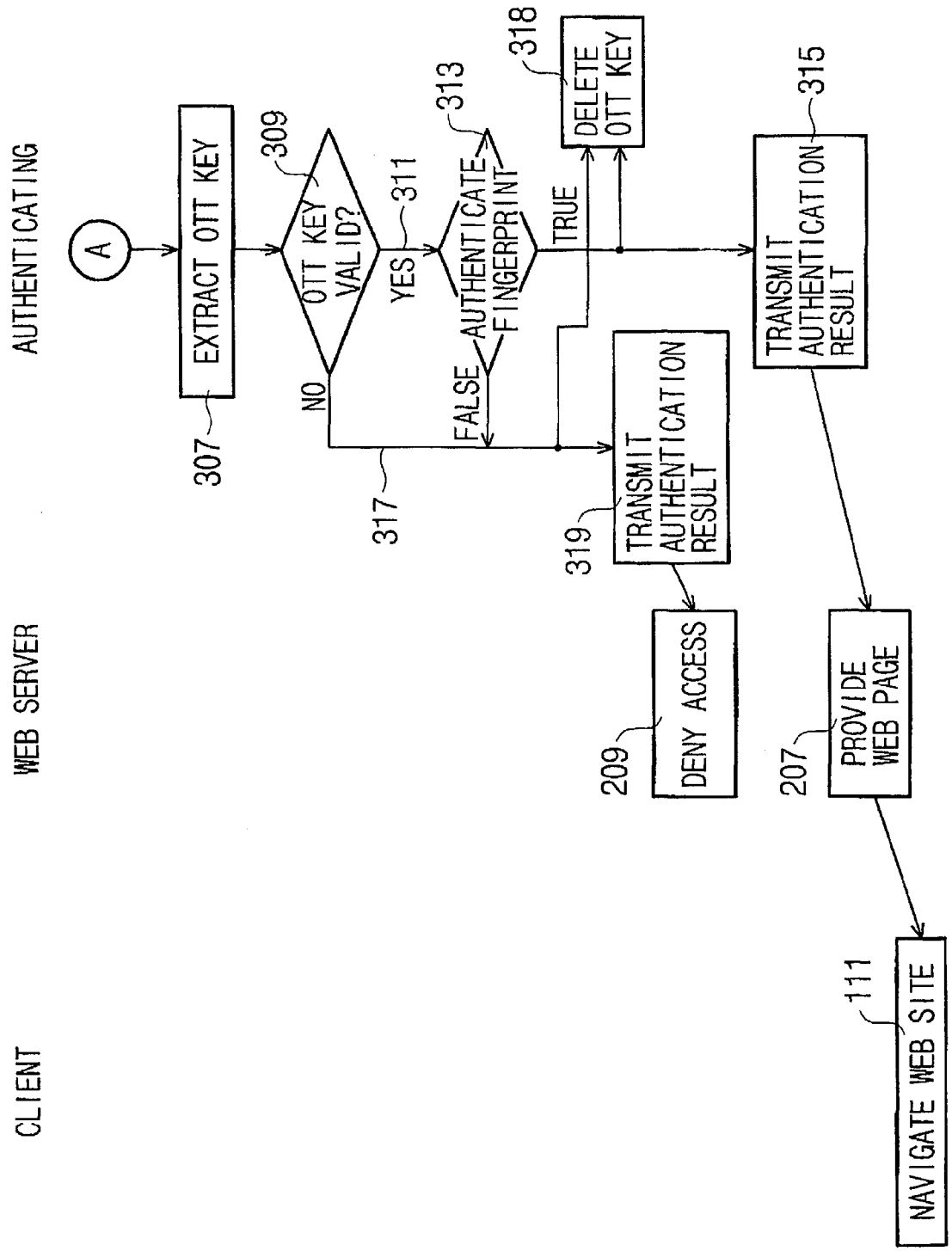

FIGS. 5A and 5B show a construction of the system in FIGS. 2A and 2B, under which a web server 30 is inserted between the client 10 and the authenticating server 20. FIGS. 5C and 5D show a processing order of the web server in the process flow of FIGS. 2C and 2D.

Referring to FIGS. 5A through 5D, the web server 30 is a server providing a web page to be actually used by the user (e.g., a shopping mall site or a banking site, etc.). The web server 30 comprises a first communication interface 33 for communication with the client 10, and a second communication interface 34 for communication with the authenticating server 20. The web server 30 further comprises a data interchange section 31 for interchanging data between the client 10 and the authenticating server 20, and an authentication result receiving section 32 for receiving an authentication result transferred from the authenticating server 20.

Though not shown in the drawings, it is out of question that the client 10 includes a web browser for receiving a user authentication from the authenticating server 20 interlocked with the web server 30 through connection to the web server 30, and that the web server includes a web page transfer section for transmitting a web page to the user's PC (client) upon receipt of an authentication result that the user's access to the web server 30 has been authenticated by a storage of the web page.

As shown in FIGS. 5C and 5D, the process in a system having the construction as shown in FIGS. 5A and 5B are similar to that of FIGS. 2C and 2D. The difference lies in that the data interchange section 31 performs interchanges of a signal requesting transfer of the OTT key [step 201], of a transfer of the OTT key [step 203], and of a transfer of the encrypted OTT [step 205].

Also, if the OTT key validity determination section 26a determines validity of the OTT key, and the fingerprint authenticating section 26b authenticates the fingerprint [step 313] and transfers the result to the web server [step 315], the authentication result receiving section 32 of the web server receives the result so that the web page transfer section(not shown) can provide a web page to the client [step 207]. As a consequence, the user can be provided with a web service from the web server through the web browser installed in his/her own PC (i.e., web navigation)[step 111].

By contrast, if the OTT key validity determination section 26a determines invalidity of the OTT key, or the fingerprint authenticating section 26b refuses to authenticate the fingerprint [step 317], the result is transferred to the web server [step 319]. The web server then denies an access, and take actions of warning the user, etc. without allowing his/her log-in [step 209].

MODIFIED EMBODIMENT OF THE INVENTION

Figure 6:
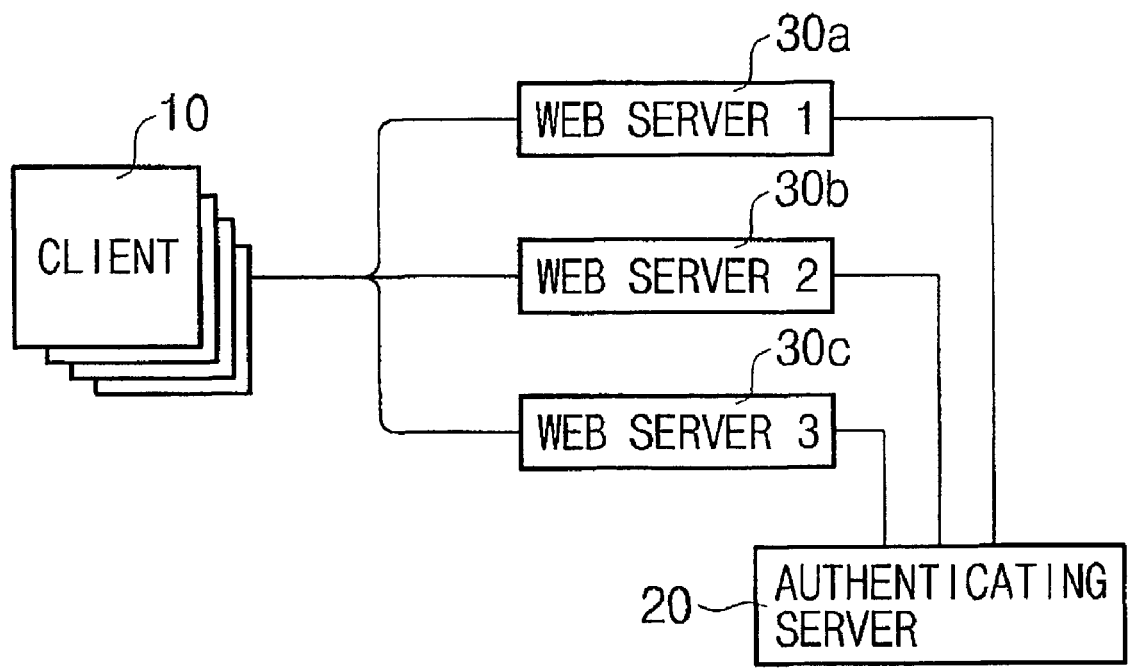
FIG. 6 is a conceptual view of a modified embodiment of the present invention.

FIG. 6 shows a modified embodiment of the system having the construction as shown in FIGS. 5A and 5B, under which a single authenticating server 20 can cover a user authentication by a plurality of web servers 30a, 30b, and 30c.

According to the present invention and the embodiments as described above, fingerprint feature data of a user are combined with an OTT key transferred from a server. The combined result is encrypted and transferred to an authenticating server. The authenticating server then confirms validity of the OTT key and authenticates the user based on the fingerprint. Thus, the present invention has an advantage of preventing a false authentication misusing a fingerprint template including the fingerprint feature data, even if exposed to a network, because the OTT key is used only once for authentication. Moreover, no additional hardware is required for user authentication according to the present invention because the HTTP(hypertext transfer protocol) is used per se. Therefore, the security of a system is enhanced without installing an additional application port by the authenticating server.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A user authenticating system including a web server for providing web services, a user's PC, which is a client desiring a user authentication for access to the web server through a network, and an authenticating server for performing authentication upon request thereof by the user, the request transferred from the client through the web server through connection to the web server, characterized in that the client comprises:
    a client communication interface for communication with the client;
    a fingerprint input means for reading-in a user's fingerprint for obtaining authentication from the authenticating server;
    a fingerprint feature data extracting means for extracting fingerprint feature data from the inputted fingerprint;
    a one-time template (OTT) key request means for requesting from the authenticating server a transfer of an OTT key;
    an OTT key receiving means for receiving the OTT key transferred from the authenticating server;
    an OTT generation means for generating an OTT by combining the received OTT key with the fingerprint feature data; and
    an OTT encrypting means for encrypting the OTT in a predetermined manner,
    and the web server, which provides a web page to be actually used by the user, comprises:
    a first server communication interface for communication with the client server;
    a second server communication interface for communication with the authenticating server;
    a data interchange means for interchanging data between the client and the authenticating server;
    and an authentication result receiving means for receiving an authentication result transferred from the authenticating server, and transmitting the web page to the client,
    and the authenticating server comprises:
    an authentication server communication interface for communicating with the web server;
    an OTT key generation means for generating an OTT key upon request of the OTT key from the client;
    an OTT key storing means for storing the generated OTT key;
    an OTT key transfer means for transmitting the generated OTT key to the client;
    an OTT receiving means for receiving the encrypted OTT transferred from the client;
    an OTT decrypting means for restoring the original OTT by decrypting the encrypted and received OTT;
    an OTT key extracting means for extracting an OTT key from the restored OTT;
    an OTT key validity determination means for determining validity of the OTT key by comparing the OTT key stored in the OTT storing means and the OTT key extracted by the OTT key extracting means;
    a fingerprint authentication means for authenticating an access of the user based on the fingerprint thereof by comparing registered fingerprint feature data with the inputted fingerprint feature data, if the OTT key is determined to be valid, and refusing authentication if the OTT key is determined to be at least one of invalid an the fingerprint feature data do not coincide with each other as a result of comparison; and
    an OTT key deletion means for deleting the OTT key used for determining validity of the OTT key upon completion of the authenticating process by the fingerprint authentication means so that another OTT key newly generated by the OTT key generation means can be used for a next user authentication,
    whereby the authentication result receiving means provides the web page to the client upon receipt of the authentication allowing result through the web server transferred from the fingerprint authenticating means of the authenticating server, and denies the user's log-in upon receipt of the authentication refusing result through the web server transferred from the fingerprint authenticating means of the authenticating server.

2. The user authenticating system of claim 1 wherein the OTT key comprises indices representing serial numbers, and a global unique ID (GUID) appended to each index in a predetermined length to represent a random value.

3. The user authenticating system of claim 1 or 2 wherein the request for the OTT key by the OTT key request means of the client and the transfer of the OTT key by the OTT key transfer means of the authenticating server are performed by hypertext transfer protocol (HTTP).

4. The user authenticating system of claim 1 or 2 wherein the OTT encrypting means of the client performs encrypting by using a public key, and the OTT decrypting means of the authenticating server performs decrypting by using a private key.

5. The user authenticating system of claim 1 or 2 wherein the OTT encrypting means of the client and the OTT decrypting means of the authenticating server perform encrypting or decrypting by using a symmetrical key.

6. The user authenticating system of claim 1 or 2 wherein the authentication is performed by a single authenticating server connected to a plurality of web servers.

7. A user authenticating method used in the system of claim 1 or 2 comprising the steps of:
    extracting fingerprint feature data from the user's fingerprint data inputted to the fingerprint input means of the client through the fingerprint feature data extracting means;
    requesting from the authenticating server a transfer of the OTT key through the OTT request means of the client;
    generating and storing an OTT key through the OTT key generation means of the authenticating server;
    transmitting the OTT key to the client through the OTT key transfer means of the authenticating server;

generating an OTT by combining the OTT key with the fingerprint feature data received from the OTT receiving means of the client through the OTT generation means;

requesting from the authenticating server an authentication by transmitting the OTT encrypted by the OTT encrypting means of the client to the authenticating server;

restoring the original OTT by receiving the OTT encrypted and transferred by the web server through the OTT receiving means, and by decrypting the same through the OTT decrypting means;

extracting an OTT key through the OTT key extracting means of the authenticating server;

determining validity of the OTT key by comparing the extracted OTT key with the OTT key stored in the OTT key storing means;

allowing authentication of the fingerprint if the OTT key is determined to be valid, refusing authentication of the fingerprint if the OTT key is determined to be invalid, and transmitting the authentication result to the web server;

providing the web page to the client upon receipt of the result allowing an authentication from the authenticating server, and refusing log-in of the user upon receipt of the result refusing the authentication from the authenticating server; and deleting the OTT key used for the authentication so that another OTT key newly generated in the OTT key generating step can be used for a next user authentication.

8. The user authenticating method of claim 7 wherein the request for the OTT key by the OTT key request means of the client and the transfer of the OTT key by the OTT key transfer means of the authenticating server are performed by HTTP.

9. The user authenticating method of claim 7 wherein the OTT encrypting means of the client performs encrypting by using a public key, and the OTT decrypting means of the authenticating server performs decrypting by using a private key.

10. The user authenticating method of claim 7 wherein the OTT encrypting means of the client and the OTT decrypting means of the authenticating server perform encrypting or decrypting by using a symmetrical key.

11. The user authenticating method of claim 7 wherein the authentication is performed by a single authenticating server connected to a plurality of web servers.

12. The user authenticating method of claim 7 wherein the OTT key comprises indices representing serial numbers, and a GUID appended to each index in a predetermined length to represent a random value.

13. The user authenticating method of claim 12 wherein the request for the OTT key by the OTT key request means of the client and the transfer of the OTT key by the OTT key transfer means of the authenticating server are performed by HTTP.

14. The user authenticating method of claim 12 wherein the OTT encrypting means of the client performs encrypting by using a public key, and the OTT decrypting means of the authenticating server performs decrypting by using a private key.

15. The user authenticating method of claim 12 wherein the OTT encrypting means of the client and the OTT decrypting means of the authenticating server perform encrypting or decrypting by using a symmetrical key.

16. The user authenticating method of claim 12 wherein the authentication is performed by a single authenticating server connected to a plurality of web servers.

* * * * *